United States Patent
Vermoesen et al.

(10) Patent No.: US 6,766,644 B2
(45) Date of Patent: Jul. 27, 2004

(54) MASTER CYLINDER WITH BY-PASS FUNCTION AND PROPORTIONING VALVE

(75) Inventors: Michel J. Vermoesen, Miamisburg, OH (US); Byengsu Kim, Dayton, OH (US); John C. Layman, Trotwood, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/234,773

(22) Filed: Sep. 4, 2002

(65) Prior Publication Data

US 2004/0040299 A1 Mar. 4, 2004

(51) Int. Cl.[7] .................................................. B60T 11/20
(52) U.S. Cl. ....................................................... 60/562
(58) Field of Search .................... 60/562, 561

(56) References Cited

U.S. PATENT DOCUMENTS

| | | | |
|---|---|---|---|
| 4,249,379 A | * | 2/1981 | Gaiser et al. .................. 60/562 |
| 4,433,872 A | | 2/1984 | Parker et al. |
| 4,490,978 A | | 1/1985 | Hogg |
| 4,586,590 A | | 5/1986 | Rishel et al. |
| 5,609,401 A | | 3/1997 | Johnston et al. |
| 5,690,396 A | | 11/1997 | Johnston et al. |
| 6,276,137 B1 | | 8/2001 | Kottmyer et al. |

* cited by examiner

Primary Examiner—Edward K. Look
Assistant Examiner—Michael Leslie
(74) Attorney, Agent, or Firm—Michael D. Smith

(57) ABSTRACT

A master cylinder comprises a primary piston, a secondary piston, and a proportioner valve. The secondary piston is engaged with the primary piston, and the proportioner valve is disposed within the secondary piston.

14 Claims, 1 Drawing Sheet

MASTER CYLINDER WITH BY-PASS FUNCTION AND PROPORTIONING VALVE

TECHNICAL FIELD OF THE INVENTION

The present invention relates generally to brake systems for motor vehicles, and relates more specifically to a master cylinder having a proportioning valve and providing a by-pass function.

BACKGROUND OF THE INVENTION

The master cylinders on many motor vehicles operate through two separate and independent pressure circuits. In a front-to-rear split system, both front brakes are connected to one chamber of the dual master cylinder and both rear drums are connected to the other chamber. Front-to-rear split systems known as "H" split systems normally have a proportioner installed in the brake lines between the master cylinder and the rear brakes to improve front-to-rear balance at high deceleration. At a given pressure in the circuit, often referred to as the "knee point," the proportioner valve causes the rear brake pressure to rise at a slower rate than the master cylinder pressure. Conventional designs locate the proportioner valve in a separate enlarged boss on the master cylinder casting, in a screw-in module, or remotely elsewhere in the vehicle.

SUMMARY OF THE INVENTION

The present invention is a master cylinder comprising a primary piston, a secondary piston, and a proportioner valve. The secondary piston is engaged with the primary piston, and the proportioner valve is disposed within the secondary piston.

Accordingly, it is an object of the present invention to provide a master cylinder of the type described above that includes a proportioner valve.

Another object of the present invention is to provide a master cylinder of the type described above that provides a by-pass function to provide sufficient pressure to a rear brake circuit in limited circumstances.

Still another object of the present invention is to provide a master cylinder of the type described above that fits within the general packaging of the master cylinder bore.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
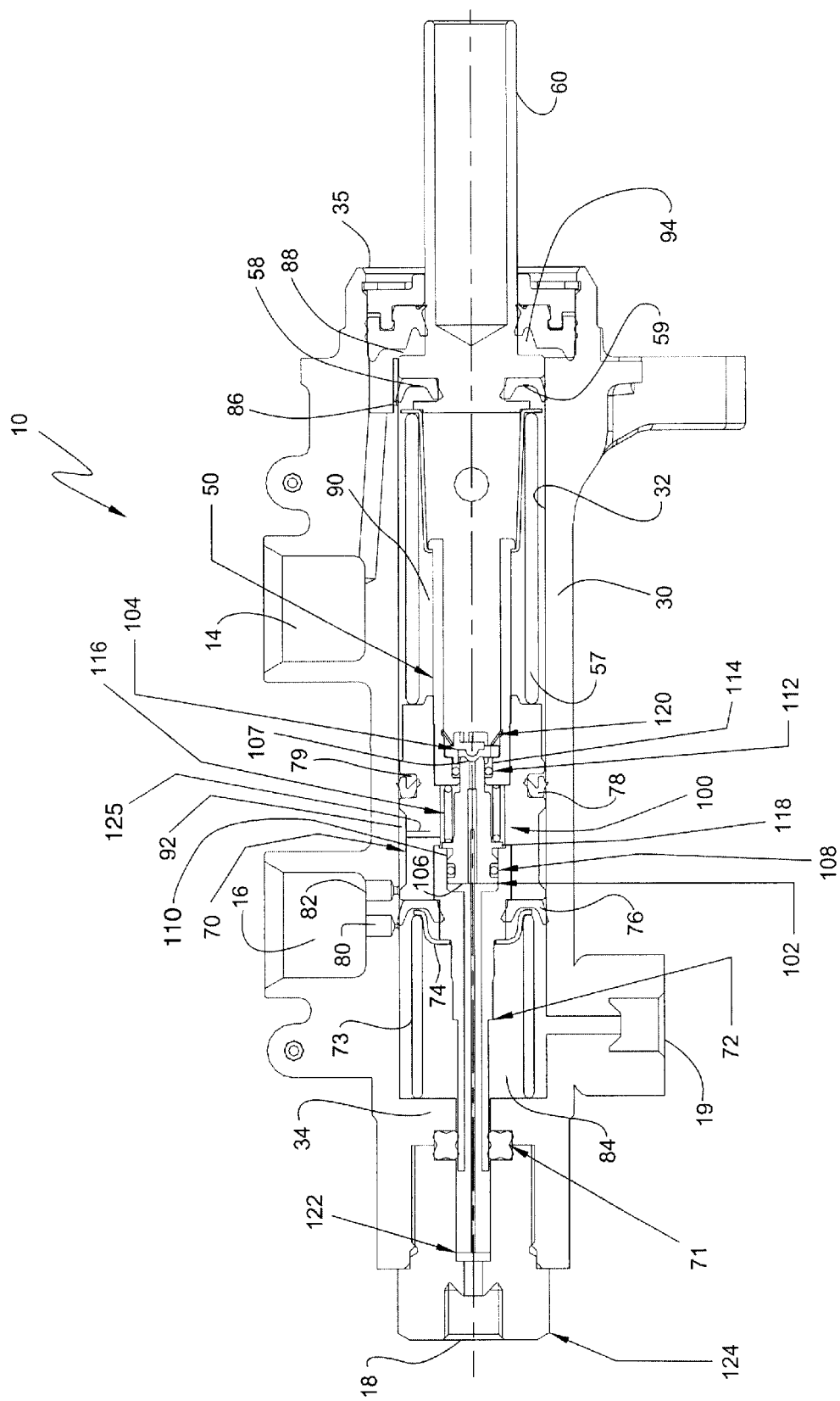
FIG. 1 is a cross-sectional view of one embodiment of a master cylinder according to the present invention.

FIG. 1 shows one embodiment 10 of a brake master cylinder suitable for a motor vehicle braking system. The master cylinder 10 has a primary reservoir inlet 14 and a secondary reservoir inlet 16 in fluid communication with a brake fluid reservoir (not shown). The master cylinder 10 is also in fluid communication with a first set of brakes through a primary outlet 18, and with a second set of brakes through a secondary outlet 19. Brake lines extending between the master cylinder 10 and the brakes may also be in fluid communication with a traction control pump inlet that is part of a traction control system automatically controlling individual ones of brakes associated with powered wheels of the vehicle to reduce sensed wheel spin upon vehicle acceleration. Such traction control systems are well known in the art, and their operation does not require further explanation. Further details are disclosed in U.S. Pat. No. 6,276,137, the disclosure of which is hereby incorporated by reference.

Master cylinder 10 comprises a cylindrical housing 30 defining an elongated bore 32 extending substantially its entire axial length. A narrowed end 34 of the housing 30 is disposed at one end of the bore 32, which opens at its opposite end through an open end 35. Separate primary 60 and secondary 70 pistons are axially movable within bore 32. A caged coil spring 57 biases the secondary piston 70 axially apart from the primary piston 60. In the absence of a compressive axial force, the spring 57 thus extends the pistons axially into the position shown. A primary seal 58 of a stiff, resilient material such as rubber is disposed in a seal groove 59 of the primary piston 60. The primary seal 58 engages the inner surface of bore 32 completely around its circumference.

The primary piston 60 is shown in a deactivated position adjacent the extreme input axial end of master cylinder 10. The primary piston 60 applies operator induced input force to axially activate the primary piston 60 in a downstream direction to the left as shown in FIG. 1 toward narrowed end 34. This input force may be boosted by a standard power brake booster in a manner known in the art. The primary piston spring 57 load is greater than a secondary spring 73 load, and is engaged with an internal shoulder of the secondary piston 70 so that activation of the primary piston 60 also provides activation of the secondary piston.

A piston duct 72 is engaged with a similar internal shoulder on the opposite side of the secondary piston 70, and extends through a quad ring 71, or any other type of multifunction seal disposed proximate the narrowed end 34. A primary seal 76 is disposed around the piston duct 72 and against the secondary piston 70. The secondary piston 70 also carries a secondary seal 78 in a seal groove 79. Each of seals 76 and 78 engages the inner surface of the bore 32 entirely around the secondary piston 70. In the inactivated position of the secondary piston 70 as shown in FIG. 1, the primary seal 76 is positioned between a secondary bypass opening 80 and a secondary compensation opening 82, both of which communicate the reservoir with the bore 32 through the secondary reservoir inlet 16. Primary seal 76 on secondary piston 70 defines a secondary pressure chamber 84 in the bore 32 adjacent the narrowed end 34. In the inactivated position of the secondary piston 70, the secondary bypass opening 80 is positioned just downstream from the primary seal 76 so that fluid from the reservoir is free to fill the secondary pressure chamber 84 or vent fluid expansion pressure from the brake system as required. When the secondary piston 70 is activated, the primary seal 76 passes over the secondary bypass opening 80 almost immediately upon the initiation of activation to close the secondary pressure chamber 84 from the reservoir so that braking pressure may be maintained therein. When the secondary piston 70 returns to its inactivated position, the seal 76 once again slides past the secondary bypass opening 80. The secondary bypass opening 80 is small in cross-sectional area, at least in part to reduce wear on the primary seal 76 as it repeatedly slides over the edge of opening 80 during brake activations and deactivations. The secondary coil spring 73 is disposed between a retainer 74 on the secondary piston 70 and the narrowed end 34 within housing 30. The spring 73 and the caged spring 57 position the secondary piston 70, as well as primary piston 60, in an inactivated position as shown in FIG. 1 in the absence of opposing pressure from the primary piston 60.

Similarly, in the inactivated position of the primary piston 60 as shown, the primary seal 58 is positioned between a primary bypass opening 86 and a primary compensation opening 88, both of which communicate the reservoir inlet 14 with the bore 32. The primary seal 58 and the secondary seal 78 on the secondary piston 70 define a primary pressure chamber 90 therebetween in bore 32. In the inactivated position of the primary piston 60, the primary bypass opening 86 is positioned just downstream from the primary seal 58, so that fluid from the reservoir is free to fill or vent the primary pressure chamber 90 as required. When the primary piston 60 is activated and deactivated, the primary seal 58 slides over the primary bypass opening 86 in a similar manner to that of the primary seal 76 on the secondary piston 70 as described above. The primary bypass opening 86 is thus made small in cross-sectional area at least in part to reduce wear on the primary seal 58.

The secondary compensation opening 82, provided upstream of the secondary bypass opening 80 and the primary seal 76 on the secondary piston 70, permits flow of brake fluid between the reservoir inlet 16 and an intermediate chamber 92 of bore 32 defined between the primary and secondary seals 76 and 78. Likewise, compensation opening 88, provided upstream of primary bypass opening 86 and the primary seal 58, permits flow of brake fluid between the reservoir inlet 14 and a rear chamber 94 defined in the bore 32 upstream of the primary seal 58. Compensation opening 82 ensures that, should the pressure in the secondary pressure chamber 84 fall below that in the intermediate chamber 92, and thus in the reservoir, brake fluid rather than air will be drawn past the primary seal 76 from the intermediate chamber 92 into the secondary pressure chamber 84. Compensation opening 88 performs the same function for fluid flow past the primary seal 58 from the rear chamber 94 into the primary pressure chamber 90 at a lower pressure.

A proportioner valve 100 is integrated into the secondary piston 70. The proportioner valve 100 includes a proportioner piston 102 and a poppet valve 104. The proportioner piston 102 is hollow, and has a larger diameter end 106 and a smaller diameter end 107. The larger diameter end 106 is sealed by an o-ring 108, or multifunction ring in a bore 110 in the piston duct 72, and the smaller diameter end 107 is similarly sealed by an o-ring 112 in a bore 114 in a valve housing 50. A proportioner spring 116 extends between the valve housing 50 and a flange 118 on the proportioner piston 102 to preload the proportioner valve 100 to a rest position.

The poppet valve 104 is held in place within the valve housing 50 by a conical spring 120. Upon initial application of the primary piston 60, equal fluid pressures build in the primary chamber 90 and in the secondary chamber 84. Because the area of the larger diameter end 106 of the proportioner piston 102 is greater than the area of the smaller diameter end 107, a force differential develops to bias the proportioner piston toward the stationary poppet valve 104 against the force of the proportioner spring 116. At a point dependent on the size and stiffness of the proportioner spring 116, the proportioner piston 102 seats against the poppet valve 104 to close off flow from the primary chamber 90 through the center of the proportioner piston 102 and the center of the piston duct 72 to the primary brake circuit. The proportioner piston 102 subsequently unseats from the poppet valve 104 as the pressure in the primary chamber 90 increases and allows pressure through the proportioner piston 102 to be again applied to the large diameter area 106 of the proportioner piston 102 to again close against the poppet valve 104. The proportioner piston 102 repeats this cycle many times during an increasing brake apply, thereby metering a reduced pressure to the primary outlet 18. The secondary piston 70 contains a vent 125 to the intermediate chamber 92 to relieve internal pressure during activation of the proportioner 100.

A detent rod 122 is mounted to an outlet cap 124, and extends through the piston duct 72 and into the center bore of the proportioner piston 102. If for any reason the poppet valve 104 is displaced axially leftwardly as shown in FIG. 1, the distal end of the detent rod 122 unseats the poppet valve from the proportioner piston 102 to provide a bypass function so that sufficient pressure is available to the rear brakes in the event of a secondary pressure chamber 84 failure.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A master cylinder comprising:
   a primary piston;
   a secondary piston engaged with the primary piston,
   a proportioner valve disposed within the secondary piston, the proportioner valve including a proportioner piston and a popper valve; and
   a proportioner sprint extending between a valve housing and the proportioner piston.

2. The master cylinder of claim 1 further comprising a first spring holding the poppet valve within the valve housing.

3. The master cylinder of claim 1 further comprising a detent rod extending through the piston duct and into the proportioner piston.

4. The master cylinder of claim 1 wherein the detent rod is adapted to unseat the poppet valve from the proportioner piston.

5. The master cylinder of claim 1 further comprising a piston duct engaged with the secondary piston, the detent rod extending through the piston duct.

6. The master cylinder of claim 1 further comprising a second spring biasing the primary and secondary pistons apart.

7. The master cylinder of claim 1 further comprising a third spring engaged with the secondary piston to bias the secondary piston toward an inactive position.

8. A master cylinder comprising:
   a housing defining a bore;
   a primary piston disposed in the bore;
   a secondary piston disposed in the bore and engaged with the primary piston;
   a proportioner valve disposed within the secondary piston, the proportioner valve including a proportioner piston and a poppet valve; and
   a proportioner spring extending between a valve housing and the proportioner piston.

9. The master cylinder of claim 8 further comprising a first spring holding the poppet valve within the valve housing.

10. The master cylinder of claim 8 further comprising a detent rod extending through the piston duct and into the proportioner piston.

11. The master cylinder of claim 10 wherein the detent rod is adapted to unseat the poppet valve from the proportioner piston.

12. The master cylinder of claim 10 further comprising a piston duct engaged with the secondary piston, the detent rod extending through the piston duct.

13. The master cylinder of claim 8 further comprising a second spring biasing the primary and secondary pistons apart.

14. The master cylinder of claim 8 further comprising a third spring engaged with the secondary piston to bias the secondary piston toward an inactive position.

\* \* \* \* \*